United States Patent Office 3,452,034
Patented June 24, 1969

3,452,034
SUBSTITUTED 2-(1,3,4-THIADIAZOL-2-YL)-4(5)-NITROIMIDAZOLES
Andrew Stephen Tomcufcik, Old Tappan, Arlene May Hoffman, Park Ridge, N.J., and Paul Frank Fabio, Pearl River, N.Y., assignors to American Cyanamid Company, Stamford, Conn., a corporation of Maine
No Drawing. Filed Oct. 3, 1967, Ser. No. 672,456
Int. Cl. C07d 99/10
U.S. Cl. 260—302    10 Claims

ABSTRACT OF THE DISCLOSURE

The preparation of 2-(5-substituted-1,3,4-thiadiazol-2-yl)-1-substituted-5-nitroimidazoles from the corresponding 2-(5-amino- or chloro-1,3,4-thiadiazol-2-yl)-1-substituted-5-nitroimidazoles, is described. The compounds prepared by the process are useful as antibacterials, amebicides, trichomonicides and coccidiostats.

---

The compounds of the present invention can be illustrated by the following formula:

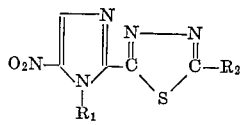

wherein $R_1$ is selected from the group consisting of lower alkyl and hydroxy lower alkyl; and $R_2$ is selected from the group consisting of halogen, hydroxyl, sulfhydryl, lower alkoxy, lower alkylthio, azido, sulfamyl and lower alkylsulfonyl.

When $R_2$ in the above formula is hydroxyl or mercapto, it is understood that the said compounds may exist in tautomeric forms, as follows:

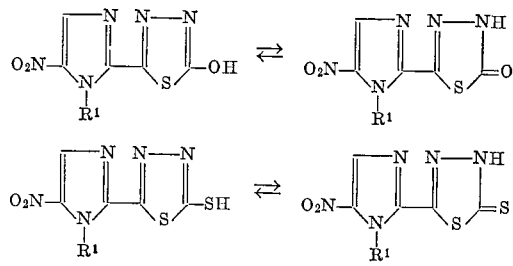

The description of the hydroxyl and mercapto compounds is intended to include the tautomeric forms within the present invention.

The compounds of this invention are, in general, crystalline solids, ranging in color from yellow to orange to brown, of limited solubility in water, but soluble in organic solvents such as lower alkyl alcohols, acetone, ethyl acetate, and the like.

Starting materials for the compounds of this invention are corresponding 2-(5-amino-1,3,4-thiadiazol-2-yl)-1-substituted-5-nitroimidazoles illustratable by the following formula:

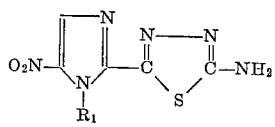

wherein $R_1$ is as defined hereinabove. The preparation of these starting materials is described hereinafter in the examples.

The starting 5-amino compounds are converted into the compounds of the present invention by chemical transformations starting with diazotization. For example, treatment of a starting 5-amino compound with sodium nitrite in sulfuric acid yields the corresponding 5-hydroxy derivative. Treatment of a starting 5-amino compound with sodium nitrite in hydrochloric acid yields the corresponding 5-chloro derivative. Other compounds of the present invention are usually most conveniently prepared by the use of the 5-chloro derivatives and well known chemical reactions, which are illustrated by the following:

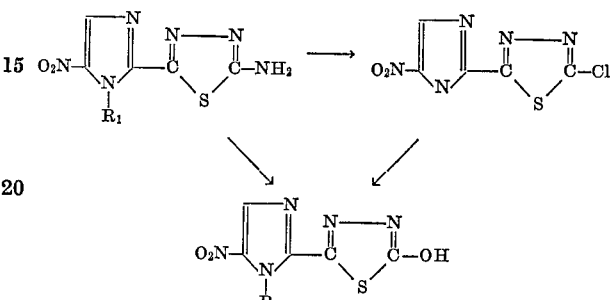

5-fluoro, 5-iodo, 5-methoxy, etc. as defined by $R_2$ wherein $R_1$ is as defined above.

Compounds of this invention such as 2-(5-hydroxy-1,3,4 - thiadiazol - 2 - yl) - 1 - methyl - 5 - nitro - imidazole have shown antibacterial and antifungal activities in vitro. To measure antibacterial and antifungal activities standard agar dilution techniques are used. Compounds to be tested are made up into stock solutions containing 12.5 milligrams of test compound per milliliter in dimethylsulfoxide. Observing sterile techniques, serial dilutions are made from each stock solution of test compound. Varying volumes of these stock solutions and each corresponding serial dilution are then added to 10 milliliters of standard sterile nutrient agar at 45° C. to effect final concentrations of 250; 125; 62.5; 31; 12.5; 6.2; and 3.1 micrograms of test compound per milliliter of medium. These dilutions are sufficient to eliminate inhibition caused by the relatively very small amounts of solvent dimethylsulfoxide remaining present. In the case of the bacteria (organisms No. 1 through No. 11) the standard sterile nutrient agar is an aqueous medium containing 1.5% agar, an enzymatic digest of casein, an enzymatic digest of soy bean meal, and the elements of these latter two. In the case of the fungi (organisms No. 12 through No. 19, inclusive) the standard sterile nutrient agar is an aqueous medium containing 1.5% agar, dextrose, meat extract, asparagine, and potassium phosphate. In each case, the acid base elements of the standard nutrient media are more than sufficient, by their concentration and buffering effect, to maintain the medium's pH at near neutrality against any acidity or alkalinity inherent in the comparatively very small amounts of test compound included—so that the procedure measures activities at or near a neutral pH where said compounds are tested as acid salts, neutral compounds, or alkaline salts. The standard sterile nutrient agar solutions containing the different dilutions of the test compounds, along with suitable and comparable control dilutions containing no test compound are then allowed to cool in Petri dishes, thereby forming solidified agar plates.

Suspensions of each of the test organisms are prepared as follows: An appropriate inoculum of each test microorganism is added to a standard nutrient broth and incubated at 37° C. for 24 hours. In the case of the bacteria and the yeast-like fungi (organisms No. 12 and No. 13) an appropriate incoulum of each test microorganism is added to a standard nutrient broth and incubated at 37° C. for 24 hours. In the case of the dermatrophytic fungi (organisms No. 14, No. 15, No. 16, No. 17, and No. 18) and the filamentous fungus (organism No. 19) spore suspensions are obtained by washing from the surface of mature agar plant cultures, using 0.9% aqueous saline containing 0.05% of surfactant (a mixture of polyoxyethylene ethers of mixed partial oleic esters of sorbitol anhydrides sold under the trade-mark Tween 80). In each case a loopful of each of the resulting live suspensions is then (still employing sterile techniques) streaked upon the surfaces of each of the agar plates, and the resulting streaked plates are then incubated at 37° C. for 24 hours (28° C. for 48 hours for the yeast-like fungi and 28° C. for 96 hours for the other fungi), after which each of the streaks of each of the plates is inspected visually and the extent, if any, of microbial growth is noted. The antimicrobial spectrum of each compound relates to the amount of the compound required to inhibit growth. Results are reported as minimal inhibitory concentrations of test compound causing complete inhibition of growth. Microorganisms used in the hereinabove described antibacterial and antifungal assay are the following:

Organism No.       Identification

Bacteria:
1 _____ Mycobacterium smegmatis ATCC 607.
2 _____ Staphylococcus aureus strain Rose ATCC 15154.
3 _____ Staphylococcus aureus strain Smith ATCC 13709.
4 _____ Streptococcus pyogenes C–203.
5 _____ Salmonella typhosa ATCC 6539.
6 _____ Proteus vulgaris ATCC 9484.
7 _____ Escherichia coli U 311.
8 _____ Escherichia coli DY.
9 _____ Klebsiella pneumoniae "A" strain AD.
10 ____ Aerobacter cloacae 75.
11 ____ Pseudomonas aeruginosa ATCC 10145.

Yeast-like fungi:
12 ____ Candida albicans.
13 ____ Cryptococcus neoformans.

Dermatophytes:
14 ____ Trichophyton tonsurans.
15 ____ Trichophyton mentagrophytes.
16 ____ Trichophyton rubrum.
17 ____ Microsporum canis.
18 ____ Microsporum gypseum.

Filamentous fungus:
19 ____ Phialphora jeanselmei.

Representative compounds of this invention such as, for example, 2-(5-hydroxy-1,3,4-thiadiazol-2-yl)-1-methyl-5-nitroimidazole and 2-(5-chloro-1,3,4-thiadiazol-2-yl)-1-methyl-5-nitroimidazole, have been tested for antibacterial and antifungal activities by means of the microbiological in vitro assay described hereinabove. Results are summarized in Table I and Table II, below:

TABLE I.—ANTIBACTERIAL ACTIVITIES OF 2-(5-HYDROXY - 1,3,4 - THIADIAZOL-2-YL)-1-METHYL-5-NITROIMIDAZOLE (COMPOUND A) AND 2-(5-CHLORO-1,3,4-THIADIAZOL-2-YL)-1-METHYL - 5 - NITROIMIDAZOLE (COMPOUND B) IN MICROGRAMS PER MILLILITER CAUSING INHIBITION

| Organism: | Compound A | Compound B |
| --- | --- | --- |
| 1 | 250 | 125 |
| 2 | 31 | 125 |
| 3 | 31 | 125 |
| 4 | 62 | >250 |
| 5 | 125 | 31 |
| 6 | >250 | 250 |
| 7 | 31 | 125 |
| 8 | 31 | 125 |
| 9 | 15 | 31 |
| 10 | 125 | >250 |
| 11 | 250 | >250 |

NOTE.—The symbol > stands for "greater than," and >250 indicates that no measured concentration caused inhibition.

TABLE II.—ANTIFUNGAL ACTIVITIES OF 2-(5-HYDROXY-1,3,4-THIADIAZOL-2-YL)-METHYL - 5 - NITROIMIDAZOLE (COMPOUND A) AND 2-(5-CHLORO-1,3,4-THIADIAZOL-2-YL) - 1 - METHYL-5-NITROIMIDAZOLE (COMPOUND B) IN MICROGRAMS PER MILLILITER CAUSING INHIBITION

| Organism: | Compound A | Compound B |
| --- | --- | --- |
| 12 | >250 | 125 |
| 13 | 15 | 31 |
| 14 | 125 | 6.2 |
| 15 | 125 | 6.2 |
| 16 | 125 | 15 |
| 17 | 125 | 6.2 |
| 18 | 250 | 6.2 |
| 19 | >250 | 250 |

NOTE.—The symbol > stands for "greater than," and >250 indicates that no measured concentration caused inhibition.

Compounds of this invention such as 2-(5-hydroxy-1,3,4 - thiadiazol-2-yl)-1-(2-hydroxyethyl)-5-nitrothiazole have shown activity as amebicides. Activities are measured by means of an assay devised from W. R. Jones, "The Experimental Infection of Rats with Entamoeba histolytica; with A Method for Evaluating the Anti-Amoebic Properties of New Compounds," Annals of Tropical Medicine and Parasitology, vol. 40, pp. 130–140 (1946).

The test organism is Entamoeba histolytica NIH 200. Cultures are maintained on Cleveland Collier liver infusion medium with serum saline 1:1 overlay in 3 x 5 test tube slants. Rice powder is added as a growth factor. Cultures are transferred at five day intervals and kept at 37° C. A 48 hour culture is used for the test inoculum and harvested the morning of the test by collecting the sediment containing rice powder and amoebae found at the junction of the butt and the salt. The amoebae are counted and the amount of inoculum for injection is adjusted to contain approximately 200,000 to 250,000 amoebae. Female Wistar strain albino rats from the Royal Hart Farms weighing 20 to 35 grams are used. The cecum is exposed during laporatomy and the amoebae-rich inoculum is injected into the anterior section. The incision is closed with autoclips. Procedures are sterile throughout the course of the surgery. The infected rats are divided randomly into groups of 10. Treatment is begun on the day of infection. Drugs are premixed in a standard labortory feed sold under the trade-mark Purina Lab. Chow by the Ralston Purina Company. Rats are maintained on the drug diet for five days at the end of which they are necropsied and the cecum examined both macroscopically for pathologic feature of infection and microscopically for the presence of amoebae. Scores of one each are recorded for evidences of mucous, fibrosus, and lesions or inflammation. A score of one is recorded for a finding of 1–20 amoeba and a score of 2 for a finding of more than 20 amoeba on a standard slide preparation. Total score of 0–5, thus, is possible per rat at necropsy. The arithmetic mean of the combined A.D.I.'s in a test or control group of rats is considered to be the group ADI. Activities are expressed in percentage of suppression of group ADI of a test group to the group ADI or a control group. Consumption of test compound is determined from the weight of feed consumed.

By the assay described above, the compound N-(5-nitro-2-thiazolyl)imidazolidin-2-one, a recognized amoebicide, showed a suppression of 85% of controls when tested at a concentration of 0.05% in the diet, the test animals consuming an average of 56 milligrams per kilogram of body weight per rat per day. The compound 2-(5-hydroxy-1,3,4-thiadiazol-2-yl)-1-methyl - 5 - nitroimidazole, of the compounds of this invention showed a suppression of 97% of controls also at 0.05% in the diet, the test animals consuming 65 mg./kg. Comparable values for two other of the compounds of the invention, 2-(5-chloro-1,3,4-thiadiazol-2-yl)-1-methyl - 5 - nitroimidazole and 2 - (5-hydroxy-1,3,4-thiadiazol-2-yl)-1-(2-hydroxyethyl)-5-nitrothiazole were 56% at 0.05% in the diet and 72 milligrams per kilogram consumption and 70% at 0.025% in the diet and 30 milligrams per kilogram consumption.

Compounds of this invention such as 2-(5-hydroxy-1,3,4-thiadiazol-2-yl)-1-methyl-5-nitroimidazole have shown activity as trichomonicides in animal tests designed to detect this activity. Female mice (MF–1 strain) are inoculated subcutaneously with approximately 50,000 *Trichomonas vaginalis* (Thoms strain) suspended in a cysteine-peptone-liver infusionmaltose medium described by Garth Johnson and Ray E. Trussell, "Experimental Basis for the Chemotherapy of *Trichomonas vaginalis* Infestations I.," Proceedings of the Society for Experimental Biology and Medicine vol. 54, pp. 245–249 (1943). In control animals, approximately one week postinoculation, the site of inoculation is marked by a subcutaneous abcess which contains numerous Trichomonads in a menstruum of pus. In effectively treated animals the abcesses are either undectectable or greatly reduced in size, and motile trichomonads cannot be detected in the lesion-derived material after prolonged microscopic examination. Presence of a single motile trichomonad after treatment is recorded as a negative result.

Treatment by test drugs consists either of one or more oral doses suspended in 0.2% agar and administered by gavage one day post inoculation, or by administration in the diet for five consecutive days beginning one day post inoculation. The diet is a commercial laboratory feed sold under the trade-mark Purina Lab. Chow by the Ralston-Purina Company. The test compound is mixed thoroughly in the carrier, either the 0.2% agar or ground laboratory feed. Each regimen is administered to a test group consisting of five or ten mice. Control groups of five or ten mice receive the carrier alone. Gavage doses are estimated for the average mouse weight obtained just before dosing. Drug intakes resulting from diet therapy are estimated from average mouse weights and total group feed intakes during the treatment period.

Activities in this test are compared to that of 1-(2-hydroxyethyl)-2-methyl-5-nitroimidazole, a well known and widely recognized trichomonicide. In this assay 1-(2-hydroxyethyl)-2-methyl-5-nitroimidazole when administered at a dosage of 0.1% of the diet and when the test mice consumed an average of 270 mg./kg. of body weight of test compound per day, was 100% effective. The same compound, when administered at a dosage of 0.05% of the diet, and when the test mice consumed an average of 75–135 mg./kg. of body weight of test compound per day, was 95% effective.

Using the same test conditions, the compound 2-(5-hydroxy-1,3,4-thiadiazol-2-yl)-1-methyl-5-nitroimidazole of this invention, when administered at a dosage of 0.1% of the diet, and when the test mice consumed an average of 265 mg./kg. of body weight of test compound per day, was 100% effective. The same test conditions, the compound 2-(5-mercapto-1,3,4-thiadiazol-2-yl)-1-methyl-5-nitroimidazole of this invention, when administered at a dosage of 0.1% of the diet, and when the test mice consumed an average of 215 mg./kg. of body weight of test compound per day was 20% effective. Also, using the same test conditions and procedure the compound 2-(5-chloro-1,3,4-thiadiazol-2-yl)-1-methyl-5-nitroimidazole of this invention, when administered at a dosage of 0.5% of the diet, and when the test mice consumed an average of 195 mg./kg. of body weight of test compound per day was 40% effective.

Other compounds of this invention such as, for example, 2-(5-fluoro-1,3,4-thiadiazol-2-yl)-1-methyl-5-nitroimidazole have anticoccidial activity against *Eimeria tenella* and *Eimeria acervulina* in animal tests described as follows: The test animals are Peterson Cross cockerels obtained from Kerr Hatchery, Frenchtown, N.J., at one day of age. At six days of age the chicks are weighed individually and placed into equal weight groups of five-gram increments. From these groups, birds are selected at random for inclusion into equal weight groups of five or ten birds each. The group within each test are uniform with respect to the weight range of its chicks. Medicated and control diets are then presented appropriately to the groups of birds while they are still in uncontaminated quarters. During the whole period of the test, the birds eat and drink ad libitum. Control groups are maintained on a standard unmedicated commercial chicken diet. Test groups are maintained on the same standard diet in which a measured concentration of test compound has been incorporated homogeneously. Within each test unmedicated control groups and standard reference drug control groups are set up. Nitrophenide [which is bis(3-nitrophenyl)disulfide] at 0.025% of the diet is used as reference drug standard against *Eimeria tenella*; and N-(p-nitrophenyl)-$N^4$-acetylsulfanilamide at 0.03% in the diet is used as the reference drug standard against *Eimeria acervulina*. Two days after presentation of the diets, the birds are moved in their cages into the infected quarters where they are individually inoculated with oocysts of *Eimeria tenella* and *Eimeria acervulina* as follows:

The quantity of *E. tenella* material to be inoculated is determined immediately prior to its use by means of titrating given quantities, 1 ml. and fractions of 1 ml., in birds similar to those that are used in the test. That amount of inoculum which gives about 90% mortality in the titration birds is used in the usual screening test. The inoculum is stored in a refrigerator. The stock inoculum is prepared by inoculating approximately 5,000 sporulated oocysts into chicks three or more weeks old. Eight days after the inoculation, the birds are killed, and the ceca are removed intact and placed into an electric homogenizer. Sufficient 2.5% potassium bichromate is added to float the ceca which are then ground until the resulting material is of a uniform consistency. The liquid is dispensed into 500 ml. Erlenmeyer flasks to a depth of approximately one inch and the flasks are loosely capped. The oocysts are sporulated by shaking in a shaking machine for aeration for 48 to 72 hours at room temperature.

The stock inoculum for *E. acervulina* is prepared similarly, except that the material is collected by removing the portion of the small intestine between the gizzard and the yolk stalk and grinding this for the oocysts. After sporulation, *E. acervulina* oocysts are compared with the previous lot of oocysts by inoculating 5,000, 10,000 and 25,000 sporulated oocysts into one week old chicks and examining for comparable weight gains, lesions and oocysts production. Test inoculum is then prepared containing per milliliter that amount of *E. tenella* inoculum which gives about 90% mortality by titration and about 5,000 sporulated *E. acervulina* oocysts.

Infection is accomplished by inoculating one milliliter of prepared inoculum directly into the crops of the birds by means of a plastic tube attached to a syringe. A ten milliliter syringe is filled with inoculum which has been adjusted so that the required amount of oocysts to be inoculated (determined by previous titration in chicks) is continued in one milliliter of fluid. Five birds are inoculated with the material in the syringe and the remainder of the inoculum is returned to the stock container where it is constantly agitated by a magnetic stirrer. After infection, group weights are taken on the third day after inoculation, and from these the average percent weight gain is calculated. There is relatively little effect of the disease at this time, and reduced weight gains compared with the unmedicated control groups are indicative of toxicity of the compounds. Feed weights for the control groups and any group indicating toxicity are taken at this time and the average feed and drug intake for the group is calculated.

The test terminates on the seventh day after inoculation. Birds in "active" groups are again weighed to determine percent weight gain. All surviving birds are killed and examined for lesions due to the two diseases. Effectiveness or activity against *E. tenella* is based on the number of survivors among test groups compared to the number of survivors among untreated control groups, based on statistical analyses. Lesion moderation and chick growth are further criteria of efficacy. Activity against *E. acervulina* is based upon prevention of lesions and oocyst production.

The compound 2-(5-hydroxy-1,3,4-thiadiazol-2-yl)-1-methyl-5-nitroimidazole of the new compounds of this invention, when assayed by the same procedure, has been found active against *Eimeria tenella* at a concentration of 0.0005% of the diet. Assayed by the same method, the compounds 2-(5-hydroxy-1,3,4-thiadiazol-2-yl)-1-ethyl-5-nitroimidazole and 2-(5-hydroxy-1,3,4-thiadiazol-2-yl)-1-(2-hydroxyethyl)-5-nitroimidazole of this invention were found active against *Eimeria tenella* at concentrations of 0.0125% of the diet. Assayed by the same method, the compound 2-(5-fluoro-1,3,4-thiadiazol-2-yl)-1-methyl-5-nitroimidazole of the compounds of this invention was found to be active against *Eimeria tenella* at a concentration of 0.0178% of the diet.

As antibacterials or antifungals, compounds of this invention may be administered orally or parenterally in the usual pharmaceutical forms, or possibly in the diet, and/or as compositions of active ingredient in an edible carrier. Such compositions would include tablets, scored or unscored, or hard or soft shell capsules. Excipients might include lactose, starch, buffers, disintegrating agents, lubricants, homogenizing agents, and the like. Parenteral compositions could include similar agents and also preservatives, emulsifiers, surfactants, and the like in solutions, suspensions, syrups, etc. Additional excipients might include sweeteners, flavorings, colorings, or perfumes. Topical preparations may also prove useful. Such compositions would be designed for administration to subjects exposed to, or infected with sensitive bacteria or fungi for either treatment or prophylaxis.

In addition, compounds of this invention may be used in the form of solutions, suspensions, emulsions, washes, dusts, mists, soaps, or other forms for the purpose of cleaning, disinfecting, or sterilizing laboratory glassware or instruments, hospital walls or other surfaces, linens, dishes or the like. These compounds might be incorporated into soaps, detergents, sprays or the like in the home, barn, cages, coops, farm or other places where the purpose is to prevent or minimize infection or contamination with sensitive bacteria or fungi.

As ameobicides, the trichomonicides, or anticoccidials, compounds of this invention may be prepared in any of the forms indicated above, although it is thought likely that preparations for oral administration against infection with sensitive organisms would be most important.

In summary, it is anticipated that compounds of this invention will prove widely useful in a wide variety of vehicles, modes, or means of administration or dispersal for the purpose of minimizing, preventing, controlling, treating, ameliorating, or curing infection or contamination with sensitive organisms. Amoebiasis (amoebic dysentery) is an important and serious parasitic disease in the higher warm blooded animals and also in horses, cattle, dogs, hogs, sheep, goats, rabbits, rats, mice, squirrels, monkeys, and others. The most important causative agents are protozoans of the genus Entamoeba in the Class Sarcodina, the most important single species being *Entamoeba histolytica*. Trichomoniasis is a parasitic disease of warm-blooded animals. Coccidiosis is a protozoan parasitic disease widespread in animals, causing a greater economic loss among domestic and game animals in temperate climates than any other protozoan disease. Coccidiosis is the most important parasitic disease of chickens, the most important causative agents being *Eimeria tenella* and *Eimeria necatrix*.

DETAILED DESCRIPTION

The following examples describe in detail the preparation of representative 2-(5-substituted-1,3,4-thiadiazol-2-yl)-1-substituted-5-nitroimidazoles of the present invention.

EXAMPLE 1

Preparation of 2-(5-hydroxy-1,3,4-thiadiazol-2-yl)-1-methyl-5-nitroimidazole

A mixture of 4.71 gm. (0.03 mole) of 1-methyl-2-hydroxymethyl-5-nitroimidazole, and 13.3 gm. (0.03 mole) of lead tetra-acetate in 200 ml. of benzene, is refluxed while stirring magnetically for about 18 hours, cooled and filtered. The filtrate is washed with 50 ml. of saturated sodium carbonate solution. The organic phase is then separated, and the aqueous phase extracted twice with 30 ml. of chloroform. The combined organic phase is then dried over magnesium sulfate. After filtering and evaporating the organic phase to dryness, the filtrate gives 4.2 gm. of pale yellow 1-methyl-5-nitro-2-imidazolecarboxaldehyde, which is dissolved in 25 ml. of hot ethanol, then added to 2.5 gm. of thiosemicarbazide in 20 ml. of boiling ethanol containing two drops of concentrated hydrochloric acid. The mixture is then boiled for a few minutes with stirring, cooled and bright yellow crystals of the thiosemicarbazone of the above aldehyde are collected. The process yields 5.3 gm., which constitutes a 77.4% overall yield, said material having a melting point of 227° C. (decomposition).

To 25 ml. of hot water containing 5.7 gm., of ferric ammonium sulfate dodecahydrate, 2.68 gm. of above thiosemicarbazone is added, and the mixture is stirred magnetically in a boiling water bath. After 1 hour, an additional 75 ml. of hot water containing 17.1 gm. of ferric ammonium sulfate dodecahydrate is added to the above mixture. The mixture is then heated for approximately 3 hours in a boiling water bath, and filtered while still hot, yielding orange brown crystals which are washed thoroughly with hot water. The yield is 2.7 gm., having a melting point of from 259° to 260° C. (decomposition). This product is dissolved in about 20 ml. of hot dimethylformamide, filtered and the warm filtrate poured on ice. The precipitated product is washed thoroughly first with water, and then cold acetone, giving a yellow product which is dried in vacuo at 100° C. for several hours. The purified product, 2-(5-amino-1,3,4-thiadiazol-2-yl)-1-methyl-5-nitroimidazole, weighs 1.55 gm., and has a melting point of from 268° to 270° C. (decomposition).

A solution of 2.26 gm. (0.01 mole) of 2-(5-amino-1,3,4-thiadiazol-2-yl)-1-methyl-5-nitroimidazole in 50 ml. of concentrated sulfuric acid is cooled to 10° C., stirred, and treated with a solution of 2.0 gm. (0.029 mole) of sodium nitrite in 10 ml. of water during fifteen minutes. The reaction is maintained between 10° C. and 17° C. by external cooling. After addition of the sodium nitrite is completed, the mixture is allowed to stand at room temperature for sixteen hours. The clear yellow solution is partially neutralized (pH 4–5), the precipitate collected, washed with water, dried, and recrystallized from acetone to yield 1.1 gm. of yellow solid melting at 241–242° C.

EXAMPLE 2

Preparation of 1-ethyl-2-(5-hydroxy-1,3,4-thiadiazol-2-yl)-5-nitroimidazole

The above compound is prepared in a manner similar to that described in Example 1, wherein 2-(5-amino-1,3,4-thiadiazol-2-yl)-1-ethyl-5-nitroimidazole is substituted for 2-(5-amino-1,3,4-thiadiazol-2-yl)-1-methyl - 5 - nitroimidazole. The compound is a yellow brown solid melting at 228°–230.5° C.

EXAMPLE 3

Preparation of 2-(5-hydroxy-1,3,4-thiadiazol-2-yl)-1-(2-hydroxyethyl)-5-nitroimidazole The compound described above is prepared in a manner similar to Example 1 by replacing 2-(5-amino-1,3,4-thiadiazol-2-yl)-1-methyl - 5 - nitroimidazole with 2 - (5- amino-1,3,4 - thiadiazol-2-yl)-1-hydroxyethyl - 5 - nitroimidazole. The product melts at 184°–186° C.

EXAMPLE 4

Preparation of 2-(5-chloro-1,3,4-thiadiazol-2-yl)-1-methyl-5-nitroimidazole

A solution of 1.3 gm., (0.0058 mole) of 2-(5-amino-1,3,4-thiadiazol-2-yl)-1-methyl-5-nitroimidazole (prepared as in Example 1) is dissolved in 25 ml. of concentrated hydrochloric acid, cooled to 5° C., stirred, and treated during five minutes with a solution of 0.50 gm. (0.0073 mole) of sodium nitrite in 2 ml. of water. The mixture is kept at room temperature for eighteen hours. The precipitate present is collected, washed with water, dried and then extracted with warm acetone. Removal of the acetone leaves a solid residue which is recrystallized from a mixture of acetone and diethylether to give 0.16 gm. of yellow crystals, melting at 135°–137° C.

EXAMPLE 5

Preparation of 2-(5-chloro-1,3,4-thiadiazol-2-yl)-1-(2-hydroxyethyl)-5-nitroimidazole A 6.27 gm. portion of 1-(2-acetoxyethyl)-2-hydroxymethyl-5-nitroimidazole is refluxed with 13.3 gm. of lead tetraacetate in 200 ml. of benzene for 18 hours, cooled and filtered. The filtrate is washed with 50 ml. of saturated sodium carbonate solution, and the organic phase is separated therefrom. The remaining aqueous phase is twice extracted with 30 ml. of chloroform, and then combined with the above separated organic phase. The combined organic phases are dried under magnesium sulfate, and filtered. The organic solvents are then removed in vacuo, giving 1 - (2 - acetoxyethyl)-5-nitro-2-imidazolecarboxaldehyde. A 14.25 g. sample of the above aldehyde is treated with 5.72 g. of thiosemicarbazide in 150 ml. of 95% ethanol containing a drop of concentrated hydrochloric acid and the mixture is heated on a steam bath for 20 minutes. The hot solution is filtered to remove insoluble materials, cooled and the yellow-brown crystals are collected. The yield of 1 - (2 - acetoxyethyl)-5-nitro-2-imidazolecarboxaldehyde thiosemicarbazone is 18.8 g. after drying in a vacuum oven at 60° C. for 2½ hours. Recrystallization of the product gives a yellow solid, melting point 181–183.5° C.

The thiosemicarbazone (12 g.) is added to 77 g. of ferric ammonium sulfate dodecahydrate in 500 ml. of water at 60° C. and the mixture is heated to 90–100° for 4 hours. The mixture is cooled, the solid collected and washed with water. Only 0.92 g. (melting point 249–251°) of product is soluble in a large volume of acetone. The remaining product is dissolved in 150 ml. of dimethylformamide, filtered and the filtrate evaporated to dryness to give a solid. This solid is treated with about 20 ml. of acetone, slurried, cooled and collected to give yellow crystals. After drying in an air stream overnight, 5.5 g. (melting point 253.5–255°) of 2-(5-amino-1,3,4-thiadiazol-2-yl)-1-(2-hydroxyethyl) - 5 - nitroimidazole is obtained. A solution of 3.0 g. of 2-(5-amino-1,3,4-thiadiazol-2-yl)-1-(2-hydroxyethyl)-5-nitroimidazole in 40 ml. of concentrated hydrochloric acid is cooled to 10° C. and treated dropwise with a solution of 4.0 g. of sodium nitrite in 15 ml. of water during fifteen minutes. The mixture is stirred at room temperature for five hours and then stored at 5° C. overnight. The precipitate is collected, washed with water, dried, and then extracted with three 50 ml. portions of hot ethyl acetate. The ethyl acetate extracts are combined, washed with sodium bicarbonate solution and dried over magnesium sulfate. Removal of the ethyl acetate leaves a yellow solid which upon recrystallization from 50 ml. of ethyl acetate gives 1.4 g. of the pure compound melting at 166°–168° C.

EXAMPLE 6

Preparation of 2-(5-fluoro-1,3,4-thiadiazol-2-yl)-1-methyl-5-nitroimidazole

A mixture of 10 g. of potassium fluoride dihydrate and 350 ml. of dimethylformamide is concentrated to 150 ml. volume by boiling in an open beaker. The suspension is then cooled and 7.4 g. of 2-(5-chloro-1,3,4-thiadiazol-2-yl)-1-methyl-5-nitroimidazole added in one portion. The mixture is refluxed for one hour and diluted with 500 ml. of cold water. The precipitated solid is collected on a pad of diatomaceous earth and then dried. The solid is extracted with 400 ml. of boiling ethanol, and the ethanol extract concentrated to dryness under reduced pressure. The residual solid is dissolved in a boiling mixture of 10 ml. of benzene and 20 ml. of n-hexane, the solution then decolorized with activated charcoal and cooled at —10° C. 1.7 g. of a light tan solid, melting at 113°–115° C. is obtained.

Alternatively, the subject compound may be prepared by treating 2-(5-amino-1,3,4-thiadiazol-2-yl)-1-methyl-5-nitroimidazole in 48% fluoroboric acid with sodium nitrite solution, collecting the precipitated diazonium borofluoride and careful thermal decomposition to the fluoro derivative.

EXAMPLE 7

Preparation of 2-(5-mercapto-1,3,4-thiadiazol-2-yl)-1-methyl-5-nitroimidazole

Two grams of thiourea are added to a boiling solution of 4.9 g. of 2-(5-chloro-1,3,4-thiadiazol-2-yl)-1-methyl-5-nitroimidazole in 150 ml. of ethanol. A bright yellow precipitate is soon present. The mixture is refluxed for ninety minutes, the precipitate then collected, washed with ethanol, and dried; yield 3.3 g. melting point 236°–237° C. (dec.).

The subject compound may also be prepared by treating 2 - (5 - amino - 1,3,4 - thiadiazol-2-yl)-1-methyl-5-nitroimidazole in hydrochloric acid solution with aqueous sodium nitrite solution, and then adding the resultant diazonium chloride solution to an aqueous solution of potassium hydrogen sulfide or potassium ethyl xanthate.

EXAMPLE 8

Preparation of 2-(5-methylthio-1,3,4-thiadiazol-2-yl)-1-methyl-5-nitroimidazole

A mixture of 8.5 g. (34.9 mmol.) of 2-(5-mercapto-1,3,4-thiadiazol-2-yl)-1-methyl - 5 - nitroimidazole, 3.7 g. (34.9 mmol.) of anhydrous sodium carbonate and 2.6 ml. (41.5 mmol.) of methyl iodide in 50 ml. of dimethylformamide is heated on a steam bath with stirring for 80 minutes. The hot mixture is filtered. The insoluble solid is washed twice with dimethylformamide and three times with water. The solid is dried at 60° and gives 5.9 g. of product melting point 188°–190° C. Recrystallization from 175 ml. of acetonitrile gives 4.1 g. of product, melting point 188°–192° C. (sl. dec.). A second crop, 2.8 g., is obtained when the dimethylformamide filtrate is combined with 200 ml. of cold water and melts at 175°–184° C. The 2.8 g. is recrystallized from 75 ml. of acetonitrile and gives an additional 2.0 g. of product.

EXAMPLE 9

Preparation of 2-(5-methylsulfonyl-1,3,4-thiadiazol-2-yl)-1-methyl-5-nitroimidazole To a slurry of 2.6 g. (10.1 mmol.) of 2-(5-methylthio-1,3,4-thiadiazol-2-yl)-1-methyl-5-nitroimidazole in 80 ml. of glacial acetic acid is added in small portions, over a 15 minute period, a solution of 3.2 g. (20.2 mmol.) of potassium permanganate in 80 ml. of water with stirring at cooling (20–25° C.). The mixture is stirred for an additional 90 minutes at room temperature. The mixture is decolorized by bubbling in a slight excess of sulfur dioxide at 10–15° C. The solid obtained by filtration of the mix-

11 ture, 2.3 g., melting point 198–203° C. is recrystallized from 40 ml. of 2-methoxy-ethanol and gives 1.5 g. of product, melting at 199–202° C.

EXAMPLE 10

Preparation of 2-(5-chlorosulfonyl-1,3,4-thiadiazol-2-yl)-1-methyl-5-nitroimidazole A mixture of 4.0 g. (16.4 mmol.) of 2-(5-mercapto-1,3,4-thiadiazol-2-yl)-1-methyl-5-nitroimidazole and 100 ml. of 33% acetic acid is maintained at 4–8° C. while chlorine is bubbled in at a slow rate for one hour with stirring. The solid is collected by filtration and is washed twice with ice water, melting point Ca. 95° C. (dec.).

EXAMPLE 11

Preparation of 2-(5-sulfamyl-1,3,4-thiadiazol-2-yl)-1-methyl-5-nitroimidazole 2-(5-chlorosulfonyl-1,3,4-thiadiazol-2-yl) - 1 - methyl-5-nitroimidazole, prepared as described in Example 10, is added in small portions to 50 ml. of concentrated aqueous ammonia with stirring and cooling. The mixture is stirred for 5 minutes after the addition is complete. The mixture is filtered to remove a small amount of insoluble solid. The filtrate is treated with activated charcoal and is acidified with 68 ml. of concentrated hydrochloric acid. The mixture is filtered and the solid is washed several times with water. The dry solid, 3.9 g., is recrystallized from 180 ml. of 50% aqueous acetic acid and gives 3.0 g. (63%) of yellow product, melting point 226–228° (dec.).

EXAMPLE 12

Preparation of 2-(5-azido-1,3,4-thiadiazol-2-yl)-1-methyl-5-nitroimidazole

A solution of 5.0 g. of 2-(5-chloro-1,3,4-thiadiazol-2-yl)-1-methyl-5-nitroimidazole in 80 ml. of dimethylsulfoxide is treated with 2.0 g. of powdered sodium azide. The mixture is stirred at room temperature for two days and then added to 500 ml. of cold water. The orange precipitate is collected, washed with water, and dried, and then recrystallized from 300 ml. of ethanol to give 1.4 g. of product decomposing at 138°–139° C. with strong gas evolution.

Alternatively, the subject compound may be prepared by treating 2-(5-amino-1,3,4-thiadiazol-2-yl)-1-methyl-5-nitroimidazole in hydrochloric acid solution with sodium nitrite solution, and then adding the diazonium salt solution to an aqueous solution of sodium azide.

EXAMPLE 13

Preparation of 2-(5-methoxy-1,3,4-thiadiazol-2-yl)-1-methyl-5-nitroimidazole

Finely powdered 2 - (5-chloro-1,3,4-thiadiazol-2-yl)-1-methyl-5-nitroimidazole (2.5 g.) is added to a solution of 1.0 g. of sodium methoxide in 50 ml. of anhydrous dimethylformamide. The mixture is stirred at room temperature for sixteen hours. The solvent is then removed in vacuo, the residue triturated with 50 ml. of water, and the insoluble product collected and dried. Recrystallization from methanol gives the pure subject compound.

We claim:

1. A nitroimidazolylthiadiazole of the formula:

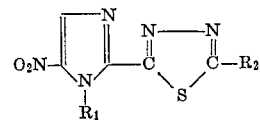

wherein $R_1$ is selected from the group consisting of lower alkyl and hydroxy lower alkyl; and $R_2$ is selected from the group consisting of halogen, hydroxyl, sulfhydryl, lower alkoxy, lower alkylthio, azido, sulfamyl and lower alkylsulfonyl.

2. The nitroimidazolylthiadiazole according to claim 1: 2 - (hydroxy-1,3,4-thiadiazol-2-yl)-1-methyl-5-nitroimidazole.

3. The nitroimidazolylthiadiazole according to claim 1: 2 - (5-hydroxy-1,3,4-thiadiazol-2-yl)-1-(2-hydroxyethyl)-5-nitroimidazole.

4. The nitroimidazolylthiadiazole according to claim 1: 2 - (5-chloro-1,3,4-thiadiazol-2-yl)-1-methyl-5-nitroimidazole.

5. The nitroimidazolylthiadiazole according to claim 1: 2 - (5-chloro-1,3,4-thiadiazol-2-yl)-1(2-hydroxyethyl)-5-nitroimidazole.

6. The nitroimidazolylthiadiazole according to claim 1: 2 - (5 - fluoro-1,3,4-thiadiazol-2-yl)-1-methyl-5-nitroimidazole.

7. The nitroimidazolylthiadiazole according to claim 1: 2 - (5-methylthio-1,3,4-thiadiazol-2-yl)-1-methyl-5-nitroimidazole.

8. The nitroimidazolylthiadiazole according to claim 1: 2 - (5 - methylsulfonyl-1,3,4-thiadiazol-2-yl)-1-methyl-5-nitroimidazole.

9. The nitroimidazolylthiadiazole according to claim 1: 2-(5-sulfamyl - 1,3,4 - thiadiazol-2-yl)-1-methyl-5-nitroimidazole.

10. The nitroimidazolylthiadiazole according to claim 1: 2 - (5-azido-1,3,4-thiadiazol-2-yl)-1-methyl-5-nitroimidazole.

References Cited

UNITED STATES PATENTS 3,025,303   3/1962   Ifversen et al. _____ 260—306.8

ALEX MAZEL, Primary Examiner.

R. J. GALLAGHER, Assistant Examiner.

U.S. Cl. X.R.

260—306.7, 306.8; 424—270